United States Patent [19]
Verellen et al.

[11] Patent Number: 6,082,655
[45] Date of Patent: Jul. 4, 2000

[54] NOISE SUPPRESSION COVER FOR BELT WEBBING RETRACTOR

[75] Inventors: Lawrence J. Verellen, Wahington; Ivanna G. Malinow, Macomb Township, both of Mich.

[73] Assignee: TRW Vehicle Safety Systems Inc., Lyndhurst, Ohio

[21] Appl. No.: 09/185,799

[22] Filed: Nov. 4, 1998

[51] Int. Cl.7 .................................................. B60R 22/34
[52] U.S. Cl. .......................................... 242/379; 181/290
[58] Field of Search ................................... 242/379, 384.1, 242/384.2, 384.3, 384.4, 384.5, 384.6, 384; 280/806; 297/478; 181/290

[56] References Cited

U.S. PATENT DOCUMENTS

| | | | |
|---|---|---|---|
| 5,209,421 | 5/1993 | Fujiwara et al. | 242/384.5 |
| 5,443,224 | 8/1995 | Patterson et al. | 242/384.2 |
| 5,504,282 | 4/1996 | Pizzirusso et al. | 181/290 |
| 5,854,452 | 12/1998 | Campbell et al. | 181/290 |

*Primary Examiner*—John M. Jillions
*Attorney, Agent, or Firm*—Tarolli, Sundheim, Covell, Tummino & Szabo L.L.P.

[57] ABSTRACT

A vehicle occupant restraint apparatus (10) comprises a length of seat belt webbing (16) extensible about a vehicle occupant and a mechanism (80) associated with the length of seat belt webbing. The mechanism (80) includes at least one movable component (82, 84) and a one-piece cover member (90) defining a chamber (88) in which the at least one movable component is located. The cover member (90) encloses the at least one movable component (82, 84) and damps audible noise generated by vibration of the at least one movable component. The one-piece cover member (90) comprises at least two layers (92, 94) of dissimilar polymeric material bonded together. The layer includes a base layer (92) and an outer layer (94). One of the layers (92, 94) is made of an impact resistant material and the other of the layers (92, 94) of a noise absorbing material bonded to the one layer.

5 Claims, 2 Drawing Sheets

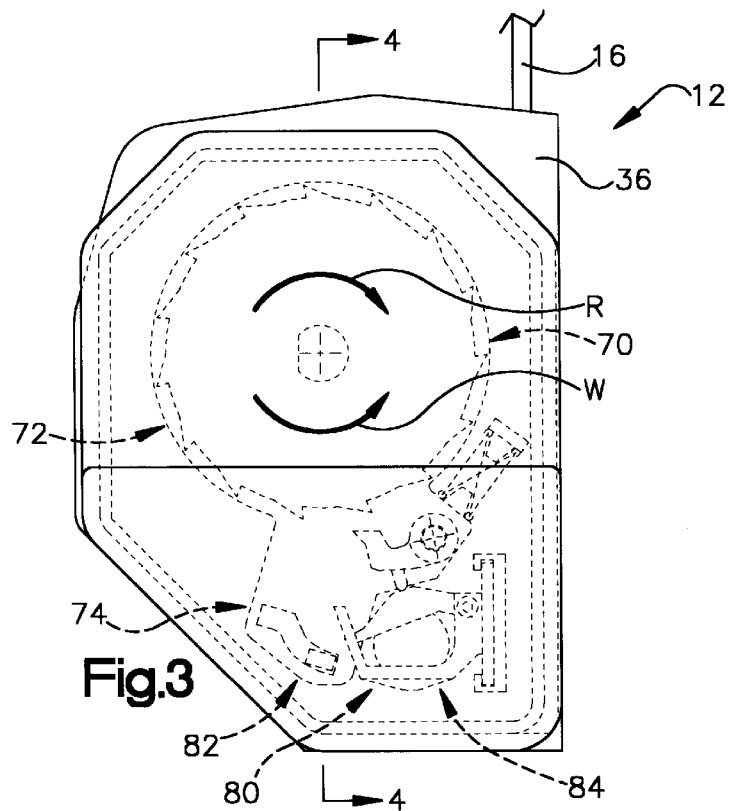
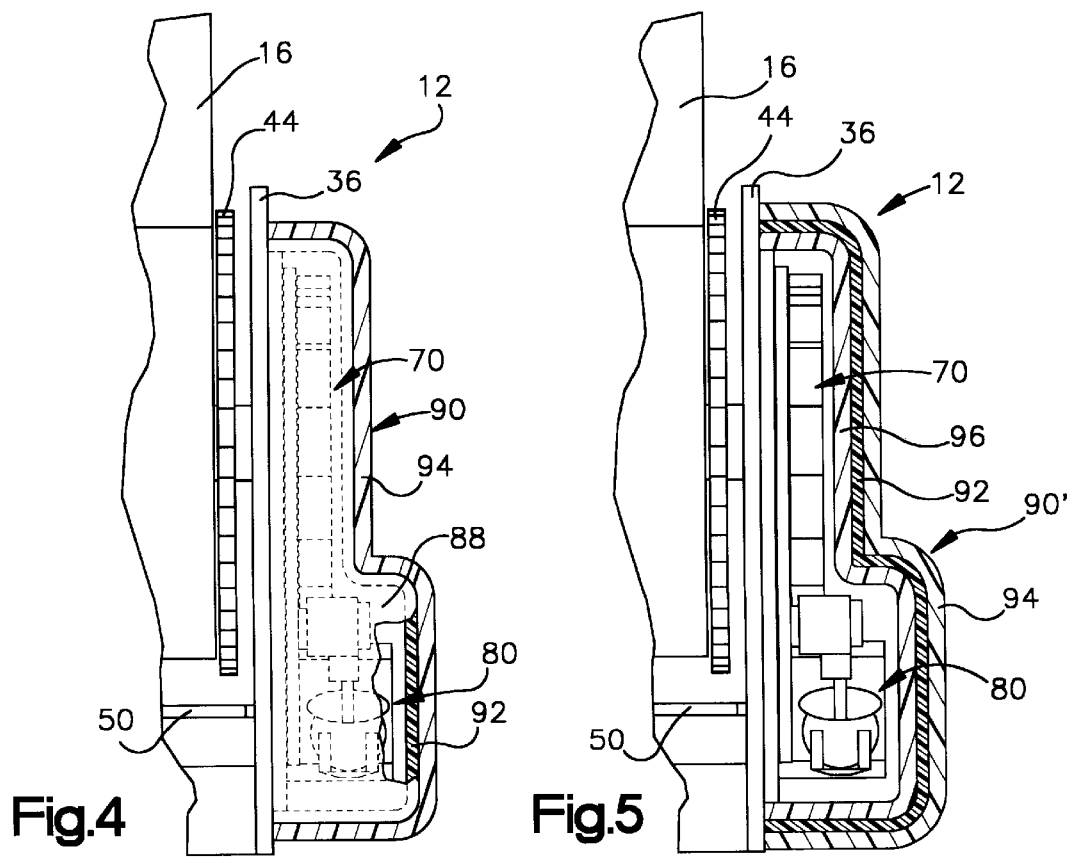

NOISE SUPPRESSION COVER FOR BELT WEBBING RETRACTOR

TECHNICAL FIELD

The present invention relates to a vehicle occupant restraint apparatus having seat belt webbing and a retractor associated with the seat belt webbing. The present invention particularly relates to a cover member for suppressing noise generated by vibration of movable components in the retractor.

BACKGROUND OF THE INVENTION

A known vehicle occupant restraint system includes a length of seat belt webbing wound on a spool of a retractor. The seat belt webbing is extensible about a vehicle occupant to help protect the occupant in the event of a vehicle collision. The retractor includes a pair of ratchet wheels fixed for rotation with the spool. A lock pawl is pivotable from an unlocked position to a locked position by a vehicle deceleration sensing device. The lock pawl is also pivotable from the unlocked position to the locked position by a webbing acceleration sensing device which senses the acceleration at which the seat belt webbing is withdrawn from the spool. In the locked position, the lock pawl engages teeth on the ratchet wheels to prevent payout of the seat belt webbing.

The vehicle deceleration sensing device and the webbing acceleration sensing device are usually enclosed underneath a cover member to prevent the ingress of dirt into the sensing devices. The vehicle deceleration sensing device and the webbing acceleration sensing device typically include numerous movable components which can vibrate, generating audible noise which may be objectionable to the vehicle occupants.

SUMMARY OF THE INVENTION

The present invention is a vehicle occupant restraint apparatus comprising a length of seat belt webbing extensible about a vehicle occupant and a mechanism associated with the length of seat belt webbing. The mechanism includes at least one movable component and a one-piece cover member defining a chamber in which the at least one movable component is located. The cover member encloses the at least one movable component and damps audible noise generated by vibration of the at least one movable component. The one-piece cover member comprises at least two layers of dissimilar polymeric material bonded together. The at least two layers includes a base layer and an outer layer. One layer of the base layer and the outer layer is made of an impact resistant material and the other layer is made of a noise absorbing material bonded to the one layer.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIG. 3 is a side view of the seat belt retractor shown in FIG. 1;

FIG. 4 is a partial sectional view taken along line 4—4 in FIG. 3; and

FIG. 5 is a view similar to FIG. 4 illustrating an alternate construction.

DESCRIPTION OF PREFERRED EMBODIMENTS

Figure 1:
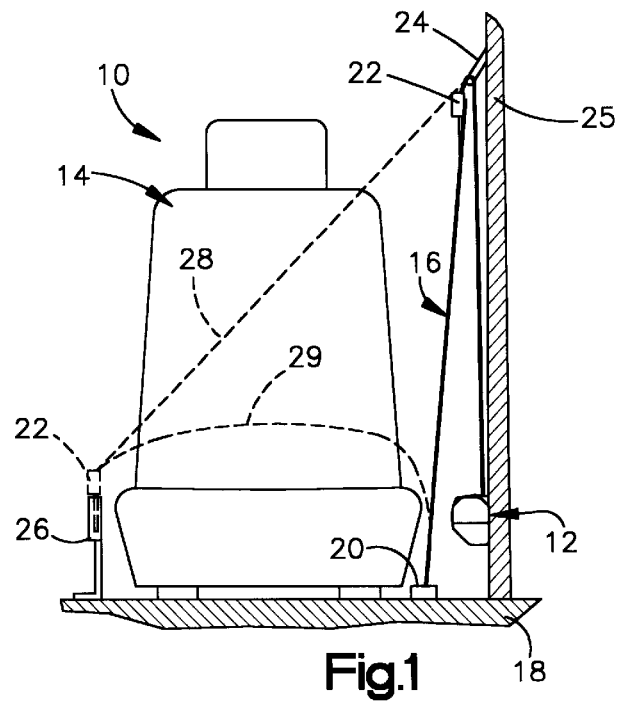
FIG. 1 is a schematic illustration of a vehicle seat belt system including a seat belt retractor constructed in accordance with the present invention.

The present invention relates to a vehicle occupant restraint apparatus having seat belt webbing and a retractor associated with the seat belt webbing. The present invention particularly relates to a cover member for suppressing noise generated by vibration of movable components in the retractor. The present invention is applicable to seat belt systems of various constructions. As representative of the present invention, FIG. 1 illustrates a three-point continuous loop seat belt system 10 for use in restraining an occupant of a vehicle.

The occupant of the vehicle sits on a vehicle seat 14 which is illustrated as a front seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 12 which is secured to the vehicle body 18 on the same side of the seat 14. Intermediate its ends, the belt webbing 16 passes through a tongue assembly 22 and a D-ring or turning loop 24 that is mounted to a B-pillar 25 above the retractor 12 and the anchor point 20. When the seat belt system 10 is not in use, the belt webbing 16 is wound on the retractor 12 and is oriented generally vertically on the one side of the seat 14, as shown in solid lines in FIG. 1.

To engage the seat belt system 10, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 12. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 10 is thus buckled, the length of belt webbing 16 is divided by the tongue assembly 22 into a torso portion 28 which extends across the torso of the occupant and a lap portion 29 which extends across the lap of the occupant.

Figure 2:
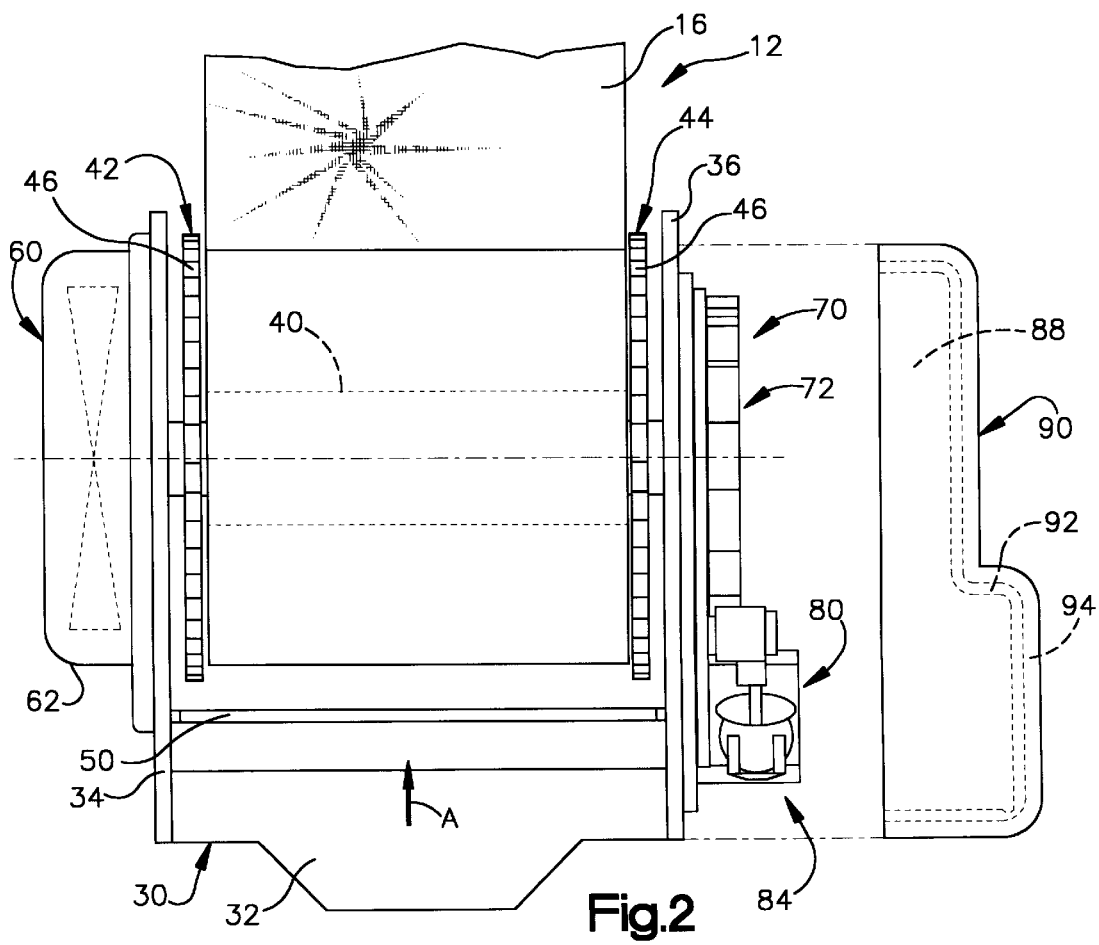
FIG. 2 is a front view of the seat belt retractor shown in FIG. 1.

The retractor 12 (FIG. 2) includes a frame 30 which is fixed to the vehicle body 18 in a manner not shown. The frame 30 is a single piece of sheet metal and has a U-shaped configuration. The frame 30 includes a back wall 32 and spaced apart, parallel first and second side walls 34 and 36 which extend generally perpendicular to the back wall.

A rotatable spool 40 on which the belt webbing 16 is wound is supported for rotation by the frame 30. First and second ratchet wheels 42 and 44 are disposed at opposite ends of the spool 40 inside the side walls 34, 36 of the frame 30. The ratchet wheels 42, 44 are fixed for rotation with the spool 40. Each of the ratchet wheels 42, 44 includes a circular array of teeth 46 disposed on its outer periphery.

The retractor 12 includes a pivotable lock pawl 50. The lock pawl 50 is disposed adjacent to and underneath (as viewed in the Figures) the ratchet wheels 42, 44. The lock pawl 50 is supported for pivotal movement in the direction of arrow A by the frame 30. The lock pawl 50 is pivotable between a locked position in which the lock pawl engages the ratchet wheels 42, 44 and an unlocked position in which the lock pawl is disengaged from the ratchet wheels. In the locked position, the lock pawl 50 blocks rotation of the ratchet wheels 42, 44 and the spool 40 in a belt withdrawal direction W (FIG. 3).

A rewind spring mechanism 60 (FIG. 2) is attached to the first side wall 34 of the frame 30. The rewind spring mechanism 60 is operatively coupled with the spool 40 and biases the spool for rotation in a belt retraction direction R (FIG. 3) which is opposite the belt withdrawal direction W. An enclosure member 62 is attached to the first side wall 34 and encloses the rewind spring mechanism 60.

A webbing acceleration sensing assembly 70 is attached to the second side wall 36 of the frame 30. The webbing acceleration sensing assembly 70 includes movable components 72 connected with the spool 40. The webbing acceleration sensing assembly 70 further includes movable components 74 operatively coupled to the lock pawl 50. The webbing acceleration sensing assembly 70 is operable to sense the withdrawal of belt webbing 16 from the spool 40 above a predetermined acceleration rate, such as occurs in a collision, and to cause the lock pawl 50 to pivot into the locked position to block further payout of the belt webbing.

The retractor 12 further includes a vehicle deceleration sensing assembly 80 attached to the second side wall 36 of the frame 30 immediately below (as viewed in the Figures) the webbing acceleration sensing assembly 70. The vehicle deceleration sensing assembly 80 includes movable components 82 operatively coupled with the lock pawl 50. The vehicle deceleration sensing assembly 80 further includes movable components 84 which sense sudden vehicle deceleration, such as occurs in a collision, and which cause the lock pawl 50 to pivot into the locked position to block further payout of the belt webbing.

The vehicle deceleration sensing assembly 80 and the webbing acceleration sensing assembly 70 are contained within a chamber 88 defined inside a one-piece cover member 90. The one-piece cover member 90 is attached to the second side wall 36 of the frame 30 in a known manner. The one-piece cover member 90 is made of first and second layers 92 and 94 (FIG. 4) of dissimilar polymeric material.

The first layer 92 of the cover member 90 is a base layer of an impact resistant material, such as acetal, having a relatively hard durometer rating. The second layer 94 of the cover member 90 is an outer layer of a noise absorbing material, such as a polyvinyl chloride and rubber compound having a relatively low durometer rating. The second layer 94 is bonded to all of the outwardly facing surfaces of the base layer 92. Preferably, the second layer 94 is co-injection molded over the base layer 92 to produce the one-piece cover member 90.

During normal driving, the vehicle deceleration sensing assembly 80 and the webbing acceleration sensing assembly 70 are subject to a variety of vibrational inputs due to vibration of the vehicle. The vibrational inputs can cause the movable components 72, 74, of the vehicle deceleration sensing assembly 70 and/or the movable components 82, 84 of the webbing acceleration sensing assembly 80 to vibrate. Vibration of the movable components 72, 74, and/or 82, 84 in ambient air generates audible noise which can be objectionable to the vehicle occupant.

The cover member 90 enclosing the movable components 72, 74, and 82, 84 of the sensing assemblies 70 and 80, respectively, damps the audible noise generated by the vibration of the movable components. More particularly, the outer layer 94 of noise absorbing material of the cover member 90 damps a portion of the generated noise and reduces sound wave propagation. Because the softer outer layer 94 is bonded directly to the structural base layer 92 of the cover member 90, there is no space between the two layers where noise generated by the sensor assemblies 70, 80 is amplified.

FIG. 5 illustrates a cover member 90' having an alternate construction. The cover member 90' includes an inner layer 96 of noise absorbing material bonded to the inwardly facing surface of the base layer 92 so that the base layer is completely encapsulated within the inner and outer layers 96 and 94. The noise absorbing material of the inner layer 96 is preferably the same material used for the outer layer 94. The inner layer 96 is preferably co-injection molded with the base layer 92 to produce the three layer, one-piece cover member 90'. The inclusion of the inner layer 96 offers additional noise damping benefits.

From the above description of the invention, those skilled in the art will perceive improvements, changes and modifications. For example, it is contemplated that the present invention could be applied to a cover for a seat belt buckle to suppress noise generated by vibration of the components inside the seat belt buckle. Such improvements, changes and modifications within the skill of the art are intended to be covered by the appended claims.

Having described the invention, we claim:

1. A vehicle occupant restraint apparatus comprising:

a length of seat belt webbing extensible about a vehicle occupant; and a mechanism associated with said length of seat belt webbing, said mechanism including at least one movable component and a one-piece cover member defining a chamber in which said at least one movable component is located, said cover member enclosing said at least one movable component and damping audible noise generated by vibration of said at least one movable component, said one-piece cover member comprising at least two layers and not more than three layers of dissimilar polymeric material co-molded together, said at least two layers including a base layer and an outer layer, one layer of said base layer and said outer layer being made of an impact resistant material and the other layer of said base layer and said outer layer being made of a noise absorbing material bonded to said one layer.

2. The vehicle occupant restraint apparatus of claim 1 wherein said mechanism comprises a seat belt webbing retractor and said at least one movable component comprises a vehicle deceleration sensing assembly.

3. The vehicle occupant restraint apparatus of claim 1 wherein said seat belt webbing retractor includes a frame, said cover member being attached to said frame.

4. The vehicle occupant restraint apparatus of claim 1 wherein said mechanism comprises a seat belt webbing retractor and said at least one movable component comprises a webbing acceleration sensing assembly.

5. The vehicle occupant restraint apparatus of claim 1 wherein said at least two layers and not more than three layers further includes an inner layer of said noise absorbing material co-molded to inwardly facing surfaces of said base layer so that said base layer is completely encapsulated between said inner and outer layers.

* * * * *